United States Patent
Kato

(10) Patent No.: US 10,877,790 B2
(45) Date of Patent: Dec. 29, 2020

(54) INFORMATION PROCESSING APPARATUS, CONTROL METHOD AND STORAGE MEDIUM

(71) Applicant: FUJITSU LIMITED, Kawasaki (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/036,374

(22) Filed: Jul. 16, 2018

(65) Prior Publication Data
US 2019/0026142 A1    Jan. 24, 2019

(30) Foreign Application Priority Data
Jul. 20, 2017    (JP) .................. 2017-140920

(51) Int. Cl.
G06F 9/455    (2018.01)
G06F 11/30    (2006.01)

(52) U.S. Cl.
CPC .......... G06F 9/45558 (2013.01); G06F 11/30 (2013.01); *G06F 2009/45595* (2013.01)

(58) Field of Classification Search
CPC .............. G06F 9/45558; G06F 11/30; G06F 2009/45595
See application file for complete search history.

(56) References Cited

U.S. PATENT DOCUMENTS

| | | | | |
|---|---|---|---|---|
| 8,468,251 B1 * | 6/2013 | Pijewski | ............... | G06F 9/5072 709/226 |
| 9,122,503 B1 * | 9/2015 | Hoff | ...................... | G06F 21/566 |
| 9,395,920 B2 * | 7/2016 | Deng | .................... | G06F 3/0613 |
| 10,191,778 B1 * | 1/2019 | Yang | .................. | G06Q 30/0283 |
| 2006/0265558 A1 | 11/2006 | Fujino | | |
| 2012/0066435 A1 * | 3/2012 | Colgrove | ................ | G06F 3/061 711/103 |
| 2018/0088804 A1 * | 3/2018 | Mummidi | ........... | G06F 13/4004 |

FOREIGN PATENT DOCUMENTS

| | | |
|---|---|---|
| JP | 2006-323539 | 11/2006 |
| JP | 2013-541766 | 11/2013 |

* cited by examiner

*Primary Examiner* — Diem K Cao
(74) *Attorney, Agent, or Firm* — Fujitsu Patent Center

(57) ABSTRACT

An information processing apparatus includes a memory; and a processor coupled to the memory and configured to process a first processing request from a first virtual environment and a second processing request from a second virtual environment different from the first virtual environment, the first processing request and the second processing request being related to a storage device that stores data, collect information concerning the first processing request and the second processing request, and determine whether either of the first virtual environment and the second virtual environment is set as a processing target of a process to suppress a reduction in performance based on the collected information.

15 Claims, 8 Drawing Sheets

FIG. 3

| | DISTRIBUTION OF SIZES OF I/O REQUESTS | NUMBER OF ISSUED I/O REQUESTS | IOPS | ... |
|---|---|---|---|---|
| VIRTUAL MACHINE #1 | NOT HIGHER THAN 4 KiB 10%<br>NOT HIGHER THAN 8 KiB 15% | BEFORE ZERO TO ONE SECONDS 40K<br>BEFORE ONE TO TWO SECONDS 39K | BEFORE ZERO TO ONE SECONDS 40K<br>BEFORE ONE TO TWO SECONDS 39K | ... |
| VIRTUAL MACHINE #2 | NOT HIGHER THAN 4 KiB 8%<br>NOT HIGHER THAN 8 KiB 9% | BEFORE ZERO TO ONE SECONDS 20K<br>BEFORE ONE TO TWO SECONDS 25K | BEFORE ZERO TO ONE SECONDS 20K<br>BEFORE ONE TO TWO SECONDS 25K | ... |
| ... | ... | ... | ... | ... |
| CONTAINER ##1 | NOT HIGHER THAN 4 KiB 20%<br>NOT HIGHER THAN 8 KiB 25% | BEFORE ZERO TO ONE SECONDS 80K<br>BEFORE ONE TO TWO SECONDS 79K | BEFORE ZERO TO ONE SECONDS 80K<br>BEFORE ONE TO TWO SECONDS 79K | ... |
| CONTAINER ##2 | NOT HIGHER THAN 4 KiB 20%<br>NOT HIGHER THAN 8 KiB 25% | BEFORE ZERO TO ONE SECONDS 60K<br>BEFORE ONE TO TWO SECONDS 70K | BEFORE ZERO TO ONE SECONDS 60K<br>BEFORE ONE TO TWO SECONDS 70K | ... |
| ... | ... | ... | ... | ... |

INFORMATION PROCESSING APPARATUS, CONTROL METHOD AND STORAGE MEDIUM

CROSS-REFERENCE TO RELATED APPLICATION

This application is based upon and claims the benefit of priority of the prior Japanese Patent Application No. 2017-140920, filed on Jul. 20, 2017, the entire contents of which are incorporated herein by reference.

FIELD

The embodiments discussed herein are related to an information processing apparatus, a control method and a storage medium.

BACKGROUND

Virtualization technologies have achieved remarkable development in recent years. A typical virtualization technology is a technology in which physical components, such as servers and storages, are logically handled to compose a resource pool and the resources in the resource pool are freely used to build an information processing system. For example, in the virtualization of a server, multiple virtual machines operate on one physical machine. Use of the virtualization technology enables efficient use of the resources, reduction in the initial investment cost of hardware, power saving, space saving, and so on to be realized.

For example, hypervisor virtualization and container virtualization have been proposed as such virtualization technologies. In the hypervisor virtualization, a hypervisor that manages the virtual machines exists and different operating systems (OSs) and applications operate on the respective virtual machines. The virtual machines operate via the hypervisor in the hypervisor virtualization. In contrast, in the container virtualization, container management software operates on one OS and multiple applications are caused to operate in different environments having independent process spaces and name spaces by the container management software. Each of the different environments for each application is called a container.

The information processing system is desirable to achieve flexible and rapid expansion depending on its application in recent years. In order to achieve such a demand, a technology called hyper converged infrastructure (HCI), which has a simple configuration and is easily managed, receives attention. The HCI is a technology in which, in the information processing system including multiple servers, an internal storage of each server is used as a virtual shared storage that is capable of being accessed from all the servers in the information processing system. Use of the HCI realizes on an information processing apparatus, such as a server, a virtual infrastructure in which an arithmetic processing function is integrated with a storage function with a virtualization foundation that is built using the virtualization technology.

In addition, a transition from a hard disk drive (HDD) in a storage device to a NAND flash memory is increasingly made with a reduction in the cost of the NAND flash memory, such as a solid state drive (SSD). The NAND flash memory has an operation speed higher than that of the HDD and further improvement in the performance in the information processing system is expected due to the transition to the NAND flash memory.

As a technology to read out and write data from and into a storage device, a technology in related art is proposed in which the operations which the SSD is caused to perform is divided into a first type operation and a second type operation depending on the length of a latency and scheduling is performed so that the first type operation is preferentially performed. In addition, a technology in the related art is proposed in which data output from each program is temporarily stored in a storage area and the data is preferentially supplied to the storage device depending on the degree of importance of the program. For example, refer to Japanese National Publication of International Patent Application No. 2013-541766 and Japanese Laid-open Patent Publication No. 2006-323539.

The container virtualization has a limit, for example, in that it is difficult for the respective containers to operate on different OSs. Accordingly, there are cases in which the hypervisor virtualization is desirably used due to operational reasons or the likes, for example, when the respective containers are desirable to operate in different OSs.

However, reading-out and writing of data from and into the storage device is performed via the hypervisor in the hypervisor virtualization. The hypervisor performs processes for the virtualization, such as conversion of an instruction transmitted from the virtual machine into a writing instruction into the physical storage device and conversion of data read out from the physical storage device for transmission to the virtual machine. Accordingly, in the hypervisor virtualization, overhead for the virtualization occurs in the reading-out and writing of data from and into the storage device and the performance of the NAND flash memory is not sufficiently used. Consequently, when the environment of the container virtualization is made compatible with the environment of the hypervisor virtualization, it is difficult to improve the performance of the reading-out and writing of data from and into the storage device.

Even with the technology in the related art in which the operations are divided into the first type operation and the second type operation depending on the length of the latency and one of the first type operation and the second type operation is preferentially processed, the operations of the respective types are instructed from both the environment of the container virtualization and the environment of the hypervisor virtualization. Accordingly, the overhead for the virtualization may possibly occur and it is difficult to improve the performance of the reading-out and writing of data from and into the storage device even with this technology in the related art.

Even with the technology in the related art in which the priority of data to be transmitted to the storage device is determined based on the degree of importance of each program, the degree of importance of the programs in the environment of the hypervisor virtualization may be high. Accordingly, it is difficult to improve the performance of the reading-out and writing of data from and into the storage device even with this technology in the related art. Considering the above problems, it is desirable to improve the performance of the reading-out and writing of data.

SUMMARY

According to an aspect of the invention, an information processing apparatus includes a memory; and a processor connected to the memory and configured to process a first processing request from a first virtual environment and a second processing request from a second virtual environment different from the first virtual environment, the first processing request and the second processing request being related to a storage device that stores data, collect information concerning the first processing request and the second processing request, and determine whether either of the first virtual environment and the second virtual environment is set as a processing target of a process to suppress a reduction in performance based on the collected information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of statistical information;

DESCRIPTION OF EMBODIMENTS

Embodiments of an information processing apparatus, an information processing system, a control method of the information processing apparatus, and a control program of the information processing apparatus disclosed in the present application will herein be described in detail with reference to the drawings. The embodiments described below are not intended to limit the information processing apparatus, the information processing system, the control method of the information processing apparatus, and the control program of the information processing apparatus disclosed in the present application.

First Embodiment

Figure 1:
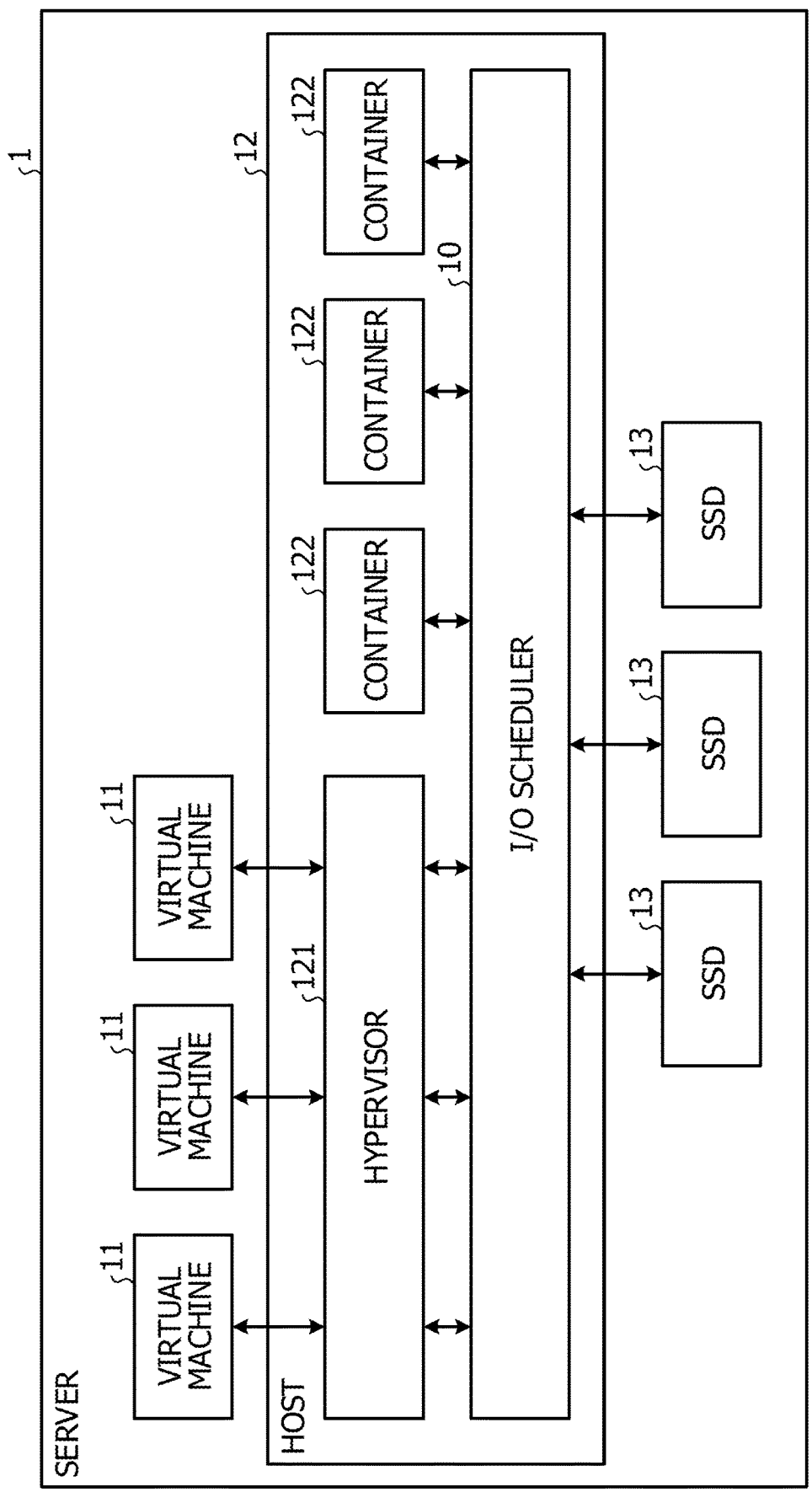
FIG. 1 is a diagram for describing a virtualization environment of a server.

FIG. 1 is a diagram for describing a virtualization environment of a server. Referring to FIG. 1, a server 1, which is an information processing apparatus, includes virtual machines 11, a host 12, and SSDs 13.

The host 12 causes a hypervisor 121 and an input-output (I/O) scheduler 10 to operate. The host 12 causes containers 122 to operate. In addition, the host 12 causes the OS, a container management software, and so on (not illustrated) to operate.

The hypervisor 121 manages the virtual machines 11. For example, the hypervisor 121 creates the virtual machines 11. The hypervisor 121 performs a virtualization process for a reading request and a writing request to the SSDs 13, which are output from the virtual machines 11.

The containers 122 are managed by the container management software executed by the host 12. For example, the containers 122 perform processes using different process spaces and name spaces allocated by the container management software.

The I/O scheduler 10 performs reading-out or writing of data from or into the SSD 13 in accordance with the reading request or the writing request to the SSD 13, which is output from the virtual machines 11 or the containers 122. The I/O scheduler 10 performs throttling for the reading request and the writing request of data to the SSDs 13, which are output from the virtual machines 11 and the containers 122.

The virtual machines 11 are managed by the hypervisor 121. Different OSs operate in the different virtual machines 11. The virtual machines 11 supply the reading request and the writing request of data to the SSDs 13 to the hypervisor 121. Then, the virtual machines 11 acquire via the hypervisor 121 a response from the SSD 13 in response to the reading request or the writing request that is output.

Figure 2:
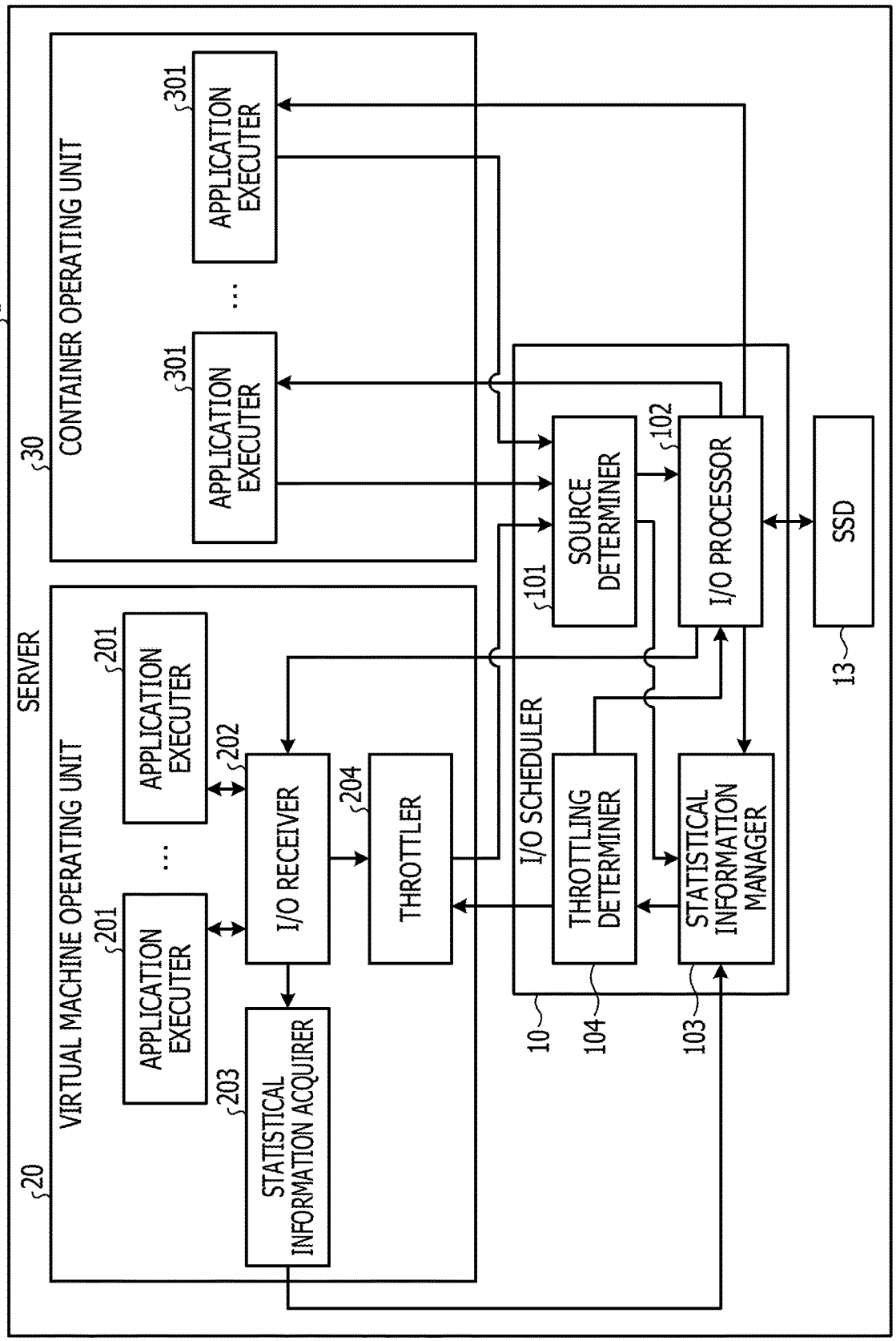
FIG. 2 is a block diagram of the server.

An input-output process performed by the I/O scheduler 10 according to a first embodiment will now be described with reference to FIG. 2. FIG. 2 is a block diagram of the server 1.

Referring to FIG. 2, the server 1 includes the I/O scheduler 10, a virtual machine operating unit 20, a container operating unit 30, and the SSD 13. The virtual machine operating unit 20 operates the virtual machines 11 in FIG. 1. The container operating unit 30 operates the containers 122 in FIG. 1.

The virtual machine operating unit 20 includes application executers 201, an I/O receiver 202, a statistical information acquirer 203, and a throttler 204. The virtual machine operating unit 20 is an example of a "first virtualization unit".

The application executers 201 are realized by the virtual machines 11. The application executers 201 execute applications. The application executers 201 supply the reading request and the writing request of data to the SSDs 13, which are generated through the execution of the applications, to the I/O receiver 202. The reading request and the writing request of data to the SSDs 13 are hereinafter referred to as "I/O requests". Then, the application executers 201 receive responses to the supplied I/O requests from the I/O receiver 202. A virtual environment including the virtual machines 11 realizing the application executers 201 is an example of a "first virtual environment".

The statistical information acquirer 203 acquires information about the I/O request output from the I/O receiver 202 from the I/O receiver 202. For example, the statistical information acquirer 203 acquires the size of the I/O request output from the I/O receiver 202, an output notification, and a notification of reception of the response from the I/O receiver 202. Then, the statistical information acquirer 203 acquires information that affects the latency of the I/O request for each I/O request. The information that affects the latency of the I/O request includes distribution of the sizes of the I/O requests, the number of the issued I/O requests for every predetermined time period, and input-output operations per second (IOPS). Then, the statistical information acquirer 203 supplies the acquired information about each I/O request to a statistical information manager 103 in the I/O scheduler 10 along with information about the source of the I/O request.

The throttler 204 receives input of the I/O request output from each application executer 201 from the I/O receiver 202. Then, the throttler 204 supplies the I/O request supplied from the I/O receiver 202 to a source determiner 101 if input of a throttling execution instruction is not received from a throttling determiner 104 in the I/O scheduler 10.

If input of the throttling execution instruction is received from the throttling determiner 104, the throttler 204 determines the share of the amount of throttling for each application executer 201 based on the number of the I/O requests output from each application executer 201.

The throttler 204 controls the output of the I/O request, which is output from each application executer 201, to the source determiner 101 in accordance with the determined share of the amount of throttling. For example, the throttler 204 receives the ratio of the IOPS of the I/O requests after the throttling is performed to the IOPS of the I/O requests before the throttling is performed, that is, the current IOPS from the throttling determiner 104 as a throttling setting. Then, the throttler 204 calculates the ratio of the IOPS after the throttling of each application executer 201 from the number of the I/O requests supplied from each application executer 201. Then, the throttler 204 controls the output of the I/O request to the source determiner 101 so that the IOPS of the I/O requests supplied from each application executer 201 is equal to the calculated ratio. For example, the throttler 204 controls the output of the I/O request to the source determiner 101 by, for example, suspending the output of the I/O request to the source determiner 101 for a predetermined time period or waiting until the I/O requests of a certain amount are accumulated.

The throttler 204 stops the throttling if an instruction to clear the throttling is received from the throttling determiner 104 during the throttling. In this case, the throttler 204 supplies the I/O request supplied from the I/O receiver 202 to the source determiner 101 without limitation.

The container operating unit 30 includes application executers 301. The container operating unit 30 is an example of a "second virtualization unit".

The application executers 301 are realized by the containers 122 in FIG. 1. The application executers 301 execute applications. The application executers 301 supply the I/O requests to the SSDs 13, which are generated through the execution of the applications, to the source determiner 101 in the I/O scheduler 10. Then, the application executers 301 receive responses to the supplied I/O requests from the source determiner 101. The virtual environment including the containers 122 realizing the application executers 301 is an example of a "second virtual environment".

The I/O scheduler 10 includes the source determiner 101, an I/O processor 102, the statistical information manager 103, and the throttling determiner 104.

The source determiner 101 receives input of the I/O requests from the throttler 204 in the virtual machine operating unit 20 and the application executers 301 in the container operating unit 30. The I/O request supplied from the throttler 204 in the virtual machine operating unit 20 is an example of a "first processing request". Each of the I/O request supplied from the application executers 301 in the container operating unit 30 is an example of a "second processing request".

The source determiner 101 determines whether the source of the acquired I/O request is the application executer 201 or the application executer 301. For example, the source determiner 101 determines the source from the volume of the I/O request to be processed. Then, the source determiner 101 notifies the statistical information manager 103 of the information about the source. In addition, the source determiner 101 supplies the acquired I/O request to the I/O processor 102.

The I/O processor 102 receives input of the I/O request from the source determiner 101. Then, the I/O processor 102 processes the I/O requests in the order in which the I/O requests have been input. In other words, when the I/O request is the request to read out data, the I/O processor 102 instructs the SSD 13 to read out data from an address specified in the reading request and, then, acquires the data from the SSD 13. When the I/O request is the request to write data, the I/O processor 102 instructs the SSD 13 to write data into an address specified in the writing request and, then, receives a writing completion response from the SSD 13. Then, the I/O processor 102 supplies the response corresponding to the I/O request to the I/O receiver 202 or the application executer 301.

In addition, the I/O processor 102 acquires the information that affects the latency of the I/O request for each I/O request. The information that affects the latency of the I/O request includes distribution of the sizes of the I/O requests, the number of the issued I/O requests for every predetermined time period, and the IOPS. The I/O processor 102 supplies the information about each I/O request to the statistical information manager 103 along with the information about the source of the I/O request. The I/O processor 102 is an example of a "processing execution unit".

The statistical information manager 103 receives the input of the information about each I/O request from the source determiner 101 and the statistical information acquirer 203 along with the information about the source of the I/O request. The statistical information manager 103 generates statistical information about the I/O requests for each source and stores the generated statistical information.

For example, the statistical information manager 103 stores statistical information illustrated in FIG. 3. FIG. 3 illustrates an example of the statistical information. Here, the statistical information manager 103 stores the information about the virtual machine 11 and the container 122 realizing each application executer 201 and each application executer 301, respectively, as the information about the sources. Referring to FIG. 3, virtual machines #1 and #2 are examples of identification information about the virtual machines 11 and containers ##1 and ##2 are examples of identification information about the containers 122.

The statistical information manager 103 calculates the distribution of the sizes of the I/O requests during a predetermined time period of each source and stores the calculated distribution, as illustrated in FIG. 3. The statistical information manager 103 collectively stores the number of the issued I/O requests for every predetermined time period of each source. The statistical information manager 103 collectively stores the IOPS for every predetermined time period of each source. Here, the statistical information manager 103 collects two kinds of statistical information: the statistical information based on the information collected by the statistical information acquirer 203 and the statistical information based on the information supplied from the I/O processor 102 for each virtual machine 11. The statistical information manager 103 is an example of an "information collecting unit" The information including the distribution of the sizes of the I/O requests, the number of the issued I/O requests, and the IOPS is an example of "information about the first processing request and the second processing request".

The throttling determiner 104 stores in advance periodic timing of determination of whether the throttling is to be performed. The throttling determiner 104 has a condition to perform the throttling in advance. The condition to perform the throttling is a condition using the virtual machine operating unit 20 as a unit. In other words, the condition to perform the throttling is a condition based on the processing performance of the I/O requests from all the application executers 201. For example, the throttling determiner 104 stores the condition to perform the throttling if the number of the I/O requests issued from all the virtual machines 11 for one second is higher than or equal to a predetermined threshold value. The condition to perform the throttling is desirably determined based on the operation state or the processing performance that is desired. The condition to perform the throttling may be determined based on the statistical information about the processes of the I/O requests in the server 1 or may be determined using a feedback of the result of the throttling that is temporarily performed.

When the timing of the determination of whether the throttling is to be performed comes, the throttling determiner 104 acquires the statistical information in the statistical information manager 103. Then, the throttling determiner 104 calculates the processing performance of the I/O requests from all the application executers 201 and the processing performance of the I/O requests from all the application executers 301 as the condition to perform the throttling. The processing performance is, for example, the latency of the I/O request. Specifically, the processing performance is the average of the number of the issued I/O requests for one second during a predetermined time period, the proportion of the I/O requests having sizes lower than or equal to a certain size during a predetermined time period, or the average of the IOPS during a predetermined time period.

Then, the throttling determiner 104 determines whether the condition to perform the throttling using the calculated processing performance is met. If the condition to perform the throttling is not met, the throttling determiner 104 confirms whether the throttling for the virtual machine operating unit 20 is being performed. If the throttling for the virtual machine operating unit 20 is being performed, the throttling determiner 104 notifies the throttler 204 of clearance of the throttling.

In contrast, if the condition to perform the throttling is met, the throttling determiner 104 determines the throttling setting for the application executer 201. Then, the throttling determiner 104 notifies the throttler 204 of an instruction to perform the throttling including the throttling setting.

An example of how to determine the throttling setting by the throttling determiner 104 will now be described. For example, the throttling determiner 104 calculates the reduction rate of the I/O requests for the application executers 201. More specifically, the throttling determiner 104 determines the ratio of the I/O requests from all the application executers 201 to the I/O requests from all the application executers 301 to be 1:2 from the statistical information in the statistical information manager 103. Then, the throttling determiner 104 shifts the ratio of the I/O requests by a predetermined value. For example, the throttling determiner 104 determines the ratio of the I/O requests to be 0.95:2.05. Then, the throttling determiner 104 notifies the throttler 204 of the throttling setting to instruct the throttler 204 to output the I/O requests at a ratio of 0.95 with respect to the current output number of the I/O requests. The throttling determiner 104 is capable of gradually making the ratio of the output of the I/O requests close to an optimal value by repeating slight change of the ratio of the output of the I/O request in the above manner. The throttling determiner 104 is an example of a "determining unit".

Figure 4:
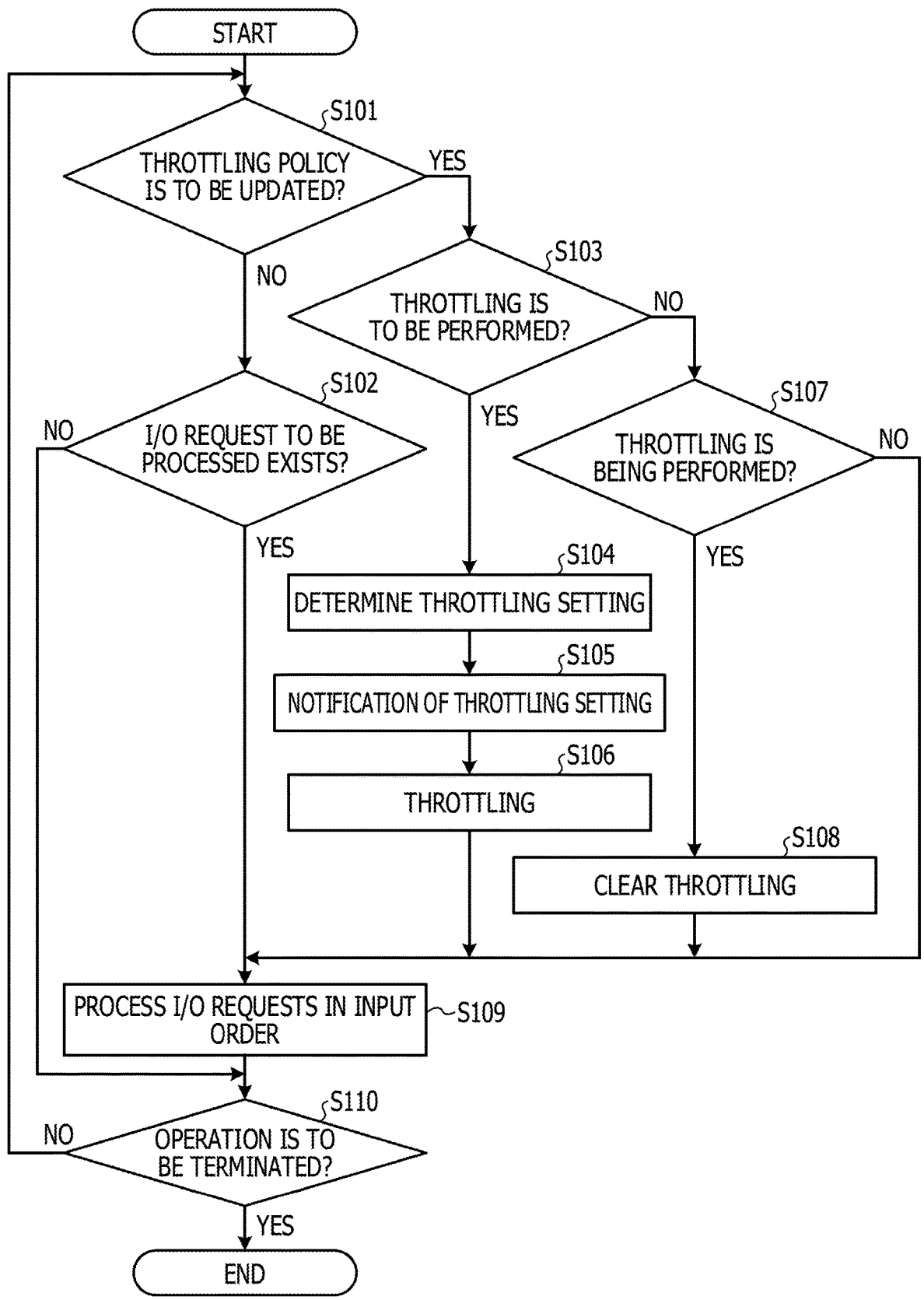
FIG. 4 is a flowchart illustrating an exemplary process to control output of an I/O request by an I/O scheduler according to a first embodiment.

How to control the output of the I/O request by the I/O scheduler 10 according to the first embodiment will now be described with reference to FIG. 4. FIG. 4 is a flowchart illustrating an exemplary process to control the output of the I/O request by the I/O scheduler 10 according to the first embodiment.

Referring to FIG. 4, in Step S101, the throttling determiner 104 determines whether a throttling policy is to be updated. The throttling policy indicates whether the throttling is to be performed and the throttling setting when the throttling is performed. For example, the throttling determiner 104 determines that the update of the throttling policy is performed, for example, upon coming of predetermined timing when the throttling is changed or input of an instruction to update the throttling policy from a manager.

If the throttling policy is not to be updated (NO in Step S101), in Step S102, the I/O processor 102 determines whether the I/O request to be processed exists. If the I/O request to be processed exists (YES in Step S102), the process goes to Step S109. If the I/O request to be processed does not exist (NO in Step S102), the process goes to Step S110.

If the throttling policy is to be updated (YES in Step S101), in Step S103, the throttling determiner 104 determines whether the throttling is to be performed using the statistical information in the statistical information manager 103. The throttling determiner 104 uses the statistical information about the I/O requests output from all the application executers 201 and all the application executers 301.

If the throttling is to be performed (YES in Step S103), in Step S104, the throttling determiner 104 determines the throttling setting using the statistical information in the statistical information manager 103.

In Step S105, the throttling determiner 104 notifies the throttler 204 of the determined throttling setting.

The throttler 204 receives the notification of the throttling setting from the throttling determiner 104. The throttler 204 acquires the information about the source of the I/O request supplied from the I/O receiver 202. The throttler 204 determines the share of the throttling for each application executer 201 from the information about the source of the I/O request. In Step S106, the throttler 204 allocates the received throttling setting to each application executer 201 at the share determined for the application executer 201 to perform the throttling for the I/O request supplied from each application executer 201. Then, the process goes to Step S109.

If the throttling is not to be performed (NO in Step S103), in Step S107, the throttling determiner 104 determines whether the throttler 204 is performing the throttling. If the throttling is not being performed (NO in Step S107), the process goes to Step S109.

If the throttling is being performed (YES in Step S107), the throttling determiner 104 notifies the throttler 204 of clearance of the throttling. The throttler 204 receives the notification of the clearance of the throttling from the throttling determiner 104. In Step S108, the throttler 204 stops the throttling that is being performed and clears the throttling.

In Step S109, the I/O processor 102 processes the I/O requests in the order in which the I/O requests have been input.

In S110, the application executers 201, the application executers 301, and the I/O scheduler 10 determine whether the operation is to be terminated based on, for example, whether input of an instruction to stop the operation is received from an operator. If the operation is not to be terminated (NO in Step S110), the process goes back to Step S101.

If the operation is to be terminated (YES in Step S110), the application executers 201, the application executers 301, and the I/O scheduler 10 stop the operations and terminate the processes of the I/O requests.

Figure 5:
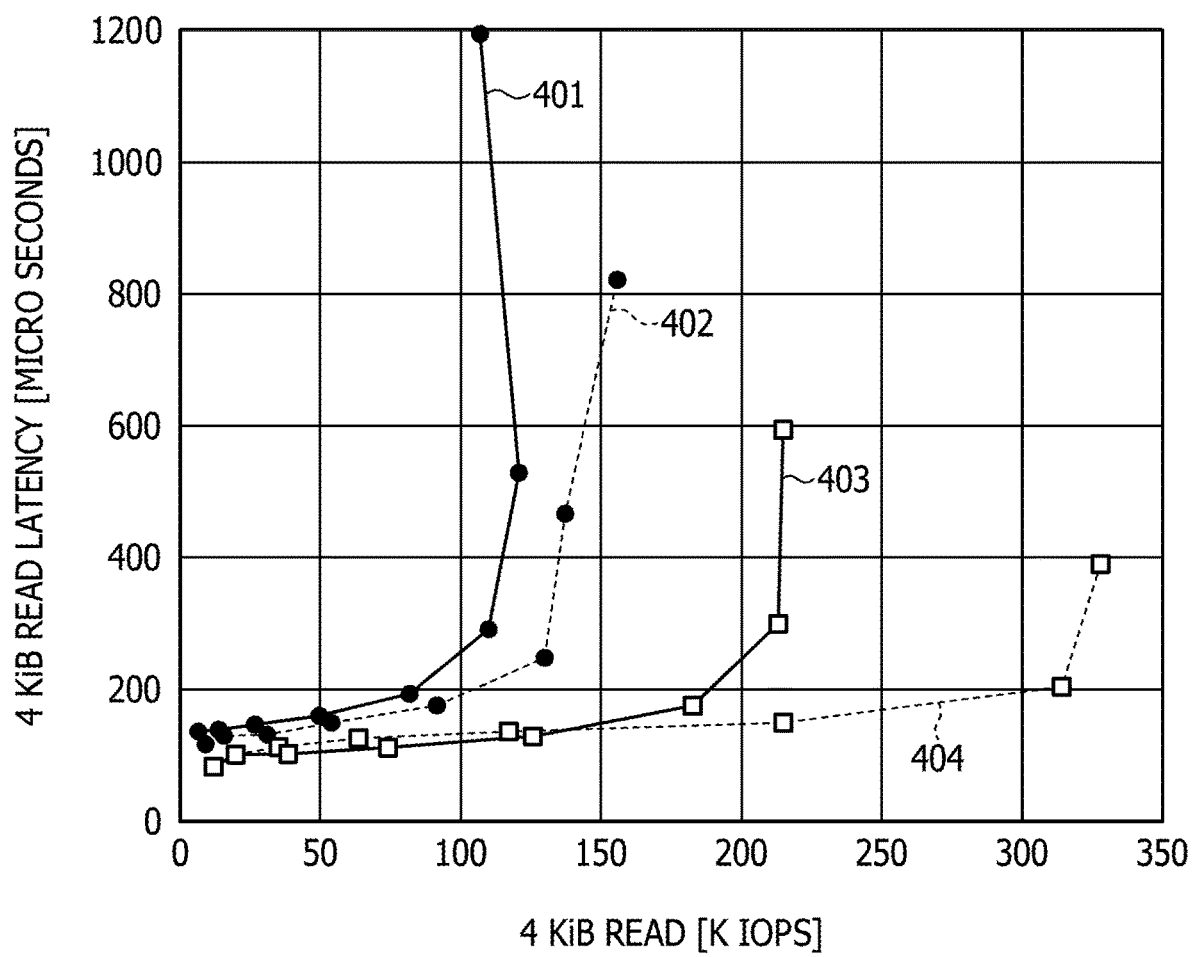
FIG. 5 is a diagram illustrating an example of the relationship between IOPS and latency.

A specific example of the throttling in the server 1 will now be described, taking a case illustrated in FIG. 5 as an example. FIG. 5 is a diagram illustrating an example of the relationship between the IOPS and the latency. Referring to FIG. 5, the vertical axis represents the latency in reading of 4-KiB data and the horizontal axis represents the IOPS in reading of 4-KiB data.

Referring to FIG. 5, a graph 401 indicates the relationship between the IOPS of the I/O requests output from the application executers 201 and the latency when the virtual machines 11 are arranged without mixture with the containers 122. A graph 402 indicates the relationship between the IOPS of the I/O requests output from the application executers 201 and the latency when the virtual machines 11 are mixed with the containers 122. A graph 403 indicates the relationship between the IOPS of the I/O requests output from the application executers 301 and the latency when the containers 122 are arranged without mixture with the virtual machines 11. A graph 404 indicates the relationship between the IOPS of the I/O requests output from the application executers 301 and the latency when the virtual machines 11 are mixed with the containers 122.

When the virtual machines 11 are arranged without mixture with the containers 122, as indicated in the graph 401, the IOPS has peaked when the IOPS reaches 120 K and the latency is increased. In contrast, when the containers 122 are arranged without mixture with the virtual machines 11, as indicated in the graph 403, the IOPS has peaked when the IOPS reaches 220 K and the latency is increased. In other words, the IOPS of the virtual machines 11 has peaked at an IOPS lower than that of the containers 122.

When the virtual machines 11 are mixed with the containers 122, as indicated in the graph 402 and the graph 404, the processing performances of the I/O requests from both the virtual machines 11 and the containers 122 are decreased in the same manner due to competition between the I/O requests from the virtual machines 11 and the I/O requests from the containers 122. In this case, the IOPS of the virtual machines 11 has peaked when the IOPS reaches 130 K. The IOPS of the containers 122 has peaked when the IOPS reaches 320 K. When the I/O requests from the virtual machines 11 and the I/O requests from the container 122 are processed at the same proportion in the case in which the virtual machines 11 are mixed with the containers 122, the IOPS does not varied and the latency is degraded even if the number of the processes of the I/O requests output from the virtual machines 11 is increased when the IOPS exceeds 120 K. In contrast, even when the IOPS exceeds 120 K, increasing the number of the processes of the I/O requests output from the containers 122 increases the IOPS and does not degrade the latency so much. Accordingly, decreasing the proportion of the processes of the I/O requests output from the virtual machines 11 and increasing the proportion of the processes of the I/O requests output from the containers 122 when the IOPS exceeds 100 K enable the entire processing performance of the I/O requests to be improved.

In this case, the throttling determiner 104 stores the condition to perform the throttling, which indicates that the throttling is performed when the number of the I/O requests issued from the virtual machines 11 for one second is greater than or equal to 100 K. If the throttling determiner 104 determines that the condition is met from the statistical information stored in the statistical information manager 103, the throttling determiner 104 acquires the current ratio of the I/O requests from the virtual machines 11 to the I/O requests from the containers 122 from the statistical information. For example, the throttling determiner 104 determines the current ratio of the I/O requests from the virtual machines 11 to the I/O requests from the containers 122 to be 1:2. Then, the throttling determiner 104 changes the ratio of the I/O requests using a reduction value of the ratio that is stored in advance. Here, the throttling determiner 104 reduces the proportion of the I/O requests from the virtual machines 11 by 0.05 and determines the ratio of the I/O requests to be 0.95:2.05. The throttling determiner 104 notifies the throttler 204 of setting of the proportion of the I/O requests from the virtual machines 11 to 0.95 when the current output number of the I/O requests is set to one.

The throttler 204 receives the notification indicating that the proportion of the I/O requests from the virtual machines 11 is set to 0.95 when the current output number of the I/O requests is set to one from the throttling determiner 104. The throttler 204 confirms the source of the I/O request supplied from the I/O receiver 202 and acquires the proportion of the number of the I/O requests issued from each application executer 201 at that time. Then, the throttler 204 determines the share of the amount of throttling for each application executer 201 based on the proportion of the I/O requests output from each application executer 201.

Although the throttler 204 determines the share of the amount of throttling for each application executer 201 in the above description, the throttling determiner 104 may determine the share of the amount of throttling for each application executer 201 and may notify the throttler 204 of the determined share.

Although the throttler 204 performs the throttling for the I/O requests output from the application executers 201 in the above description, the I/O processor 102 may perform the throttling. However, the virtualization process is performed between the application executers 201 and the I/O processor 102. Accordingly, when the I/O processor 102 performs the throttling, a load may be caused due to the virtualization process to delay the processes of the I/O requests. Consequently, the processing performance of the I/O requests is capable of being improved when the throttler 204 performs the throttling, compared with the case in which the I/O processor 102 perform the throttling.

Both the statistical information at the virtual machines 11 side, acquired by the statistical information acquirer 203, and the statistical information acquired at the I/O scheduler 10 side are used as the information concerning the I/O requests output from the application executers 201 in the first embodiment. However, either of the statistical information at the virtual machines 11 side, acquired by the statistical information acquirer 203, and the statistical information acquired at the I/O scheduler 10 side may be used.

As described above, in the server according to the first embodiment, both the virtual machines and the containers operate and, if the latency of the processes of the I/O requests output from the virtual machines is increased, the throttling is performed for the I/O requests output from the virtual machines. Accordingly, the server according to the first embodiment suppresses the number of the processes of the I/O requests output from the virtual machines and increases the number of the processes of the I/O requests output from the containers, where the overhead for the virtualization does not occur. Since the overhead for the virtualization occurs in the I/O requests output from the virtual machines, the number of the I/O requests to be processed is not greatly varied even if the number of the processes of the I/O requests is decreased when the latency is made high. In contrast, the overhead for the virtualization does not occur in the I/O requests output from the containers and the latency is not increased even in a state in which the latency of the I/O requests output from the virtual machines is made high. Increasing the number of the processes of the I/O requests output from the containers enables the processing performance of the I/O requests to be improved. Accordingly, the server according to the first embodiment is capable of improving the performance of the reading-out and writing of data by performing the above control.

Second Embodiment

A second embodiment will now be described. The server according to the second embodiment differs from the server according to the first embodiment in that, when the degradation of the processing performance of the I/O requests from the virtual server is greater than the degradation of the processing performance of the I/O requests from the containers 122, the throttling is performed to the I/O requests output from the containers. The block diagram of the server 1 according to the second embodiment is also illustrated in FIG. 2. A description of the operations of the same components as those in the first embodiment is omitted herein.

Figure 6:
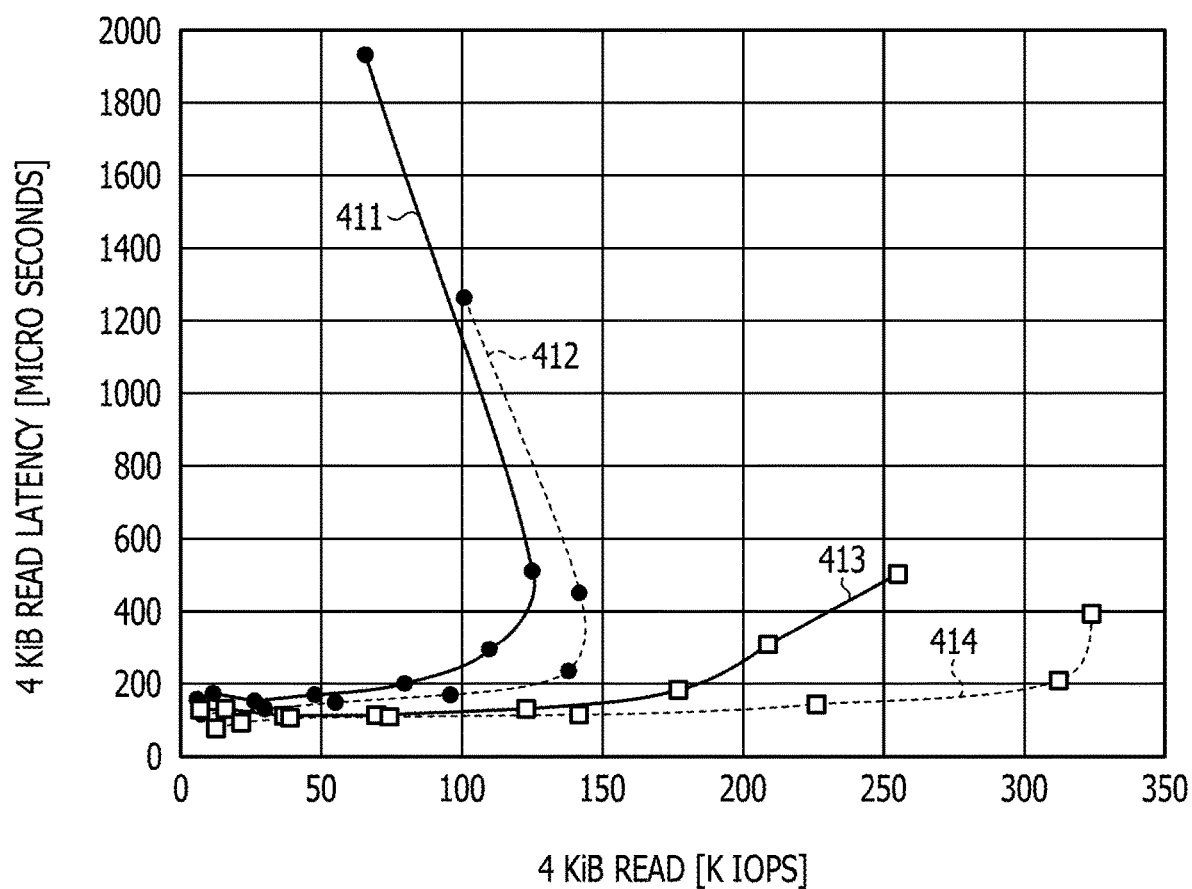
FIG. 6 is a diagram illustrating an example of the relationship between the IOPS and the latency when the processing performance of the I/O requests from a virtual server is greatly degraded, compared with the processing performance of the I/O requests from containers.

FIG. 6 is a diagram illustrating an example of the relationship between the IOPS and the latency when the processing performance of the I/O requests from the virtual server is greatly degraded, compared with the processing performance of the I/O requests from the containers. Referring to FIG. 6, a graph 411 indicates the relationship between the IOPS of the I/O requests output from the application executers 201 and the latency when the virtual machines 11 are arranged without mixture with the containers 122. A graph 412 indicates the relationship between the IOPS of the I/O requests output from the application executers 201 and the latency when the virtual machines 11 are mixed with the containers 122. A graph 413 indicates the relationship between the IOPS of the I/O requests output from the application executers 301 and the latency when the containers 122 are arranged without mixture with the virtual machines 11. A graph 414 indicates the relationship between the IOPS of the I/O requests output from the application executers 301 and the latency when the virtual machines 11 are mixed with the containers 122.

Normally, in the processing of the I/O requests by the server 1, the IOPS is not varied so much and the latency is degraded after the IOPS has reached the peak in both the I/O requests from the virtual machines 11 and the I/O requests from the containers 122, as illustrated in FIG. 5. However, the IOPS may make a transition, as illustrated by the graph 412 in FIG. 6, depending on the state of the I/O requests output from the virtual machines 11 and the containers 122. Specifically, in the I/O requests output from the virtual machines 11, the IOPS may also be decreased when the number of the outputs from the virtual machines 11 is increased after the IOPS has reached the peak. In the I/O requests output from the containers 122, the reduction in the latency is small, compared with the case in FIG. 5. In other words, it is considered that the performance of the processes of the I/O requests output from the virtual machines 11 is degraded by the processes of the I/O requests output from the containers 122. In such a case, it is considered that the processing performance of the I/O requests output from the virtual machines 11 is improved by performing the throttling to the I/O requests output from the containers 122. Accordingly, the I/O scheduler 10 according to the second embodiment performs the following operation.

The throttling determiner 104 stores a condition to perform the throttling using each of the virtual machine operating unit 20 and the container operating unit 30 as one unit. In other words, the condition to perform the throttling is a condition based on the processing performance of the I/O requests from all the application executers 201 and the processing performance of the I/O requests from all the application executers 301. For example, the throttling determiner 104 stores the condition to perform the throttling if the number of the I/O requests issued from all the virtual machines 11 for one second is higher than or equal to a virtual machine threshold value and the number of the I/O requests issued from all the containers 122 for one second is higher than or equal to a container threshold value. More specifically, the condition to perform the throttling in the cases in FIG. 5 and FIG. 6 is set in the following manner. The throttling determiner 104 stores the condition to perform the throttling if the number of the I/O requests issued from all the application executers 201 for one second is higher than or equal to 100K and the number of the I/O requests issued from all the application executers 301 for one second is higher than or equal to 200 K.

In addition, in the second embodiment, the throttling determiner 104 stores a target determination threshold value of the IOPS used for determining whether the target of the throttling is set to the virtual machines 11 or the containers 122. For example, when the state in FIG. 5 is discriminated from the state in FIG. 6, the throttling determiner 104 uses the I/O requests output from the application executers 201 as the target of the throttling if the IOPS of the I/O requests output from the application executers 201 is higher than or equal to 90 K. The throttling determiner 104 uses the I/O requests output from the application executers 301 as the target of the throttling if the IOPS of the I/O requests output from the application executers 201 is lower than 90 K.

Upon coming of the timing of the determination of whether the throttling is to be performed, the throttling determiner 104 acquires the statistical information from the statistical information manager 103. Then, the throttling determiner 104 determines whether the condition to perform the throttling is met. If the condition to perform the throttling is met, the throttling determiner 104 determines the target of the throttling based on whether the IOPS of the I/O requests output from the application executers 201 is higher than or equal to the target determination threshold value.

Then, the throttling determiner 104 determines the throttling setting of the target of the throttling. If the I/O requests output from the application executers 201 are the target of the throttling, the throttling determiner 104 notifies the throttler 204 of the throttling setting. In contrast, if the I/O requests output from the application executers 301 are the target of the throttling, the throttling determiner 104 notifies the I/O processor 102 of the throttling setting.

Upon reception of the notification of the throttling setting from the throttling determiner 104, the throttler 204 calculates the share of the throttling of each application executer 201. The throttler 204 performs the throttling to the I/O requests output from the application executers 201 in accordance with the calculated share. Then, upon reception of the notification of the clearance of the throttling from the throttling determiner 104, the throttler 204 stops the throttling.

Upon reception of the notification of the throttling setting from the throttling determiner 104, the I/O processor 102 controls the output of the I/O requests to the SSDs 13 in accordance with the throttling setting. For example, the I/O processor 102 receives the ratio of the IOPS of the I/O requests after the throttling is performed to the IOPS of the I/O requests before the throttling is performed, that is, the current IOPS from the throttling determiner 104 as the throttling setting. Then, the I/O processor 102 controls the output of the I/O requests to the source determiner 101 so that the IOPS of the I/O requests is equal to the specified ratio by, for example, suspending the output of the I/O requests to the SSDs for a predetermined time period or waiting until the I/O requests of a certain amount are accumulated. Upon reception of the notification of the clearance of the throttling from the throttling determiner 104, the I/O processor 102 stops the throttling and supplies the I/O requests supplied from the source determiner 101 to the SSDs 13 without limitation.

Figure 7:
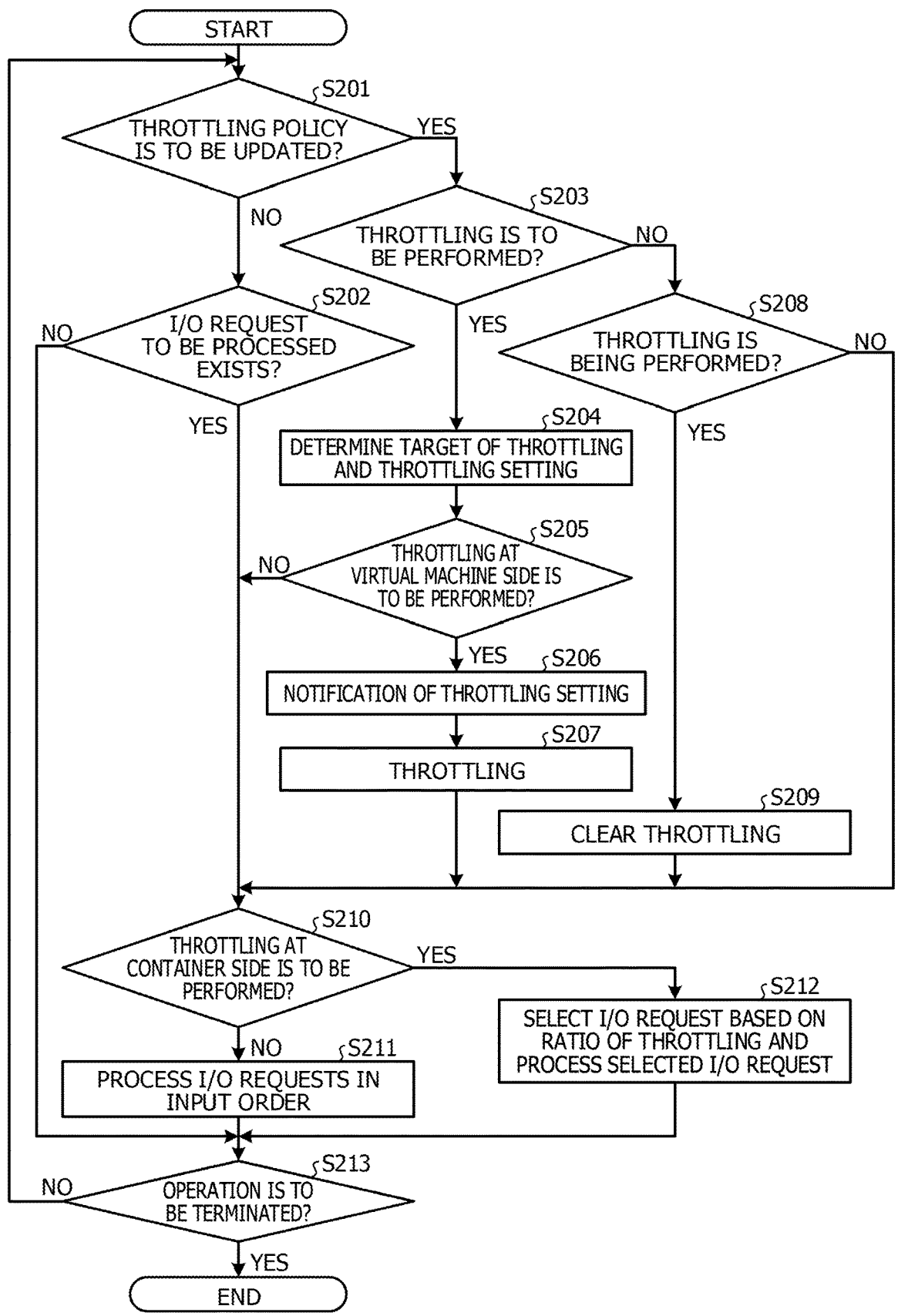
FIG. 7 is a flowchart illustrating an exemplary process to control output of the I/O request by the I/O scheduler according to a second embodiment.

How to control the output of the I/O request by the I/O scheduler 10 according to the second embodiment will now be described with reference to FIG. 7. FIG. 7 is a flowchart illustrating an exemplary process to control the output of the I/O request by the I/O scheduler 10 according to the second embodiment.

Referring to FIG. 7, in Step S201, the throttling determiner 104 determines whether the throttling policy is to be updated.

If the throttling policy is not to be updated (NO in Step S201), in Step S202, the I/O processor 102 determines whether the I/O request to be processed exists. If the I/O request to be processed exists (YES in Step S202), the process goes to Step S210. If the I/O request to be processed does not exist (NO in Step S202), the process goes to Step S213.

If the throttling policy is to be updated (YES in Step S201), in Step S203, the throttling determiner 104 determines whether the throttling is to be performed using the statistical information in the statistical information manager 103. The throttling determiner 104 uses the statistical information about the I/O requests output from all the application executers 201 and all the application executers 301.

If the throttling is to be performed (YES in Step S203), in Step S204, the throttling determiner 104 determines the target of the throttling using the statistical information in the statistical information manager 103 and the target determination threshold value and determines the throttling setting using the statistical information in the statistical information manager 103.

In Step S205, the throttling determiner 104 determines whether the throttling at the virtual machine 11 side is to be performed, that is, whether the target of the throttling is the I/O request output from the application executer 201. If the throttling at the virtual machine 11 side is not to be performed (NO in Step S205), the process goes to Step S210.

If the throttling at the virtual machine 11 side is to be performed (YES in Step S205), in Step S206, the throttling determiner 104 notifies the throttler 204 of the determined throttling setting.

The throttler 204 receives the notification of the throttling setting from the throttling determiner 104. The throttler 204 acquires the information about the source of the I/O request supplied from the I/O receiver 202. The throttler 204 determines the share of the throttling for each application executer 201 from the information about the source of the I/O request. In Step S207, the throttler 204 allocates the received throttling setting to each application executer 201 at the share determined for each application executer 201 to perform the throttling for the I/O request supplied from each application executer 201. Then, the process goes to Step S210.

If the throttling is not to be performed (NO in Step S203), in Step S208, the throttling determiner 104 determines whether the throttler 204 is performing the throttling. If the throttling is not being performed (NO in Step S208), the process goes to Step S210.

If the throttling is being performed (YES in Step S208), the throttling determiner 104 notifies the throttler 204 of clearance of the throttling. The throttler 204 receives the notification of the clearance of the throttling from the throttling determiner 104. In Step S209, the throttler 204 stops the throttling that is being performed and clears the throttling.

In Step S210, the I/O processor 102 determines whether the throttling at the container 122 side is to be performed, that is, whether the target of the throttling is the I/O request output from the application executer 301.

If the throttling at the container 122 side is not be performed (NO in Step S210), in Step S211, the I/O processor 102 processes the I/O requests in the order in which the I/O requests have been input.

If the throttling at the container 122 side is to be performed (YES in Step S210), in Step S212, the I/O processor 102 selects the I/O request based on the ratio of the throttling specified in the throttling setting and processes the selected I/O request.

In Step S213, the application executers 201, the application executers 301, and the I/O scheduler 10 determine whether the operation is to be terminated based on, for example, whether input of an instruction to stop the operation is received from the operator. If the operation is not to be terminated (NO in Step S213), the process goes back to Step S201.

If the operation is to be terminated (YES in Step S213), the application executers 201, the application executers 301, and the I/O scheduler 10 stop the operations and terminate the processing of the I/O requests.

Also in the second embodiment, the throttling for the I/O requests output from the application executers 201 may be performed by the I/O processor 102.

As described above, the server according to the second embodiment determines the target of the throttling based on the processing state of the I/O requests to perform the throttling. Accordingly, it is possible to improve the processing performance of the I/O requests when the processes of the I/O requests output from the containers degrade the processing performance of the I/O requests output from the virtual machines.

The function of the throttling by the I/O scheduler described in the above embodiments is applicable to a system in which the virtual environment in which the virtual machines operate is integrated with the virtual environment in which the containers operate and the effects and advantages described above are achieved. Such a system is exemplified by the HCI in which various functions are integrated with each other for, for example, facilitating the management of the system. However, the system in which the I/O scheduler according to the embodiments is capable of operating is not limited to the HCI and may be a storage system, such as a storage area negative (SAN).

Hardware Configuration

Figure 8:
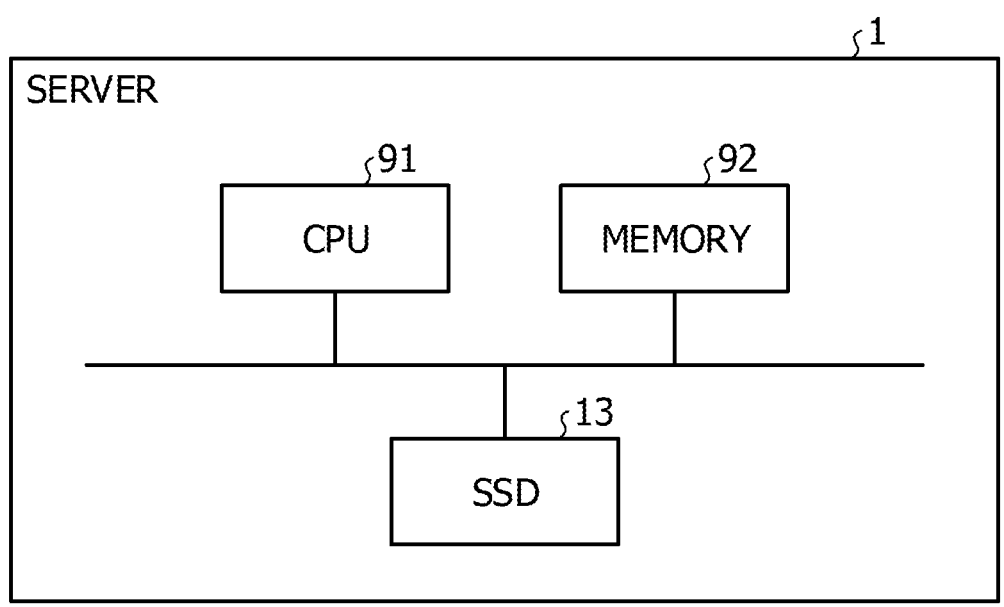
FIG. 8 is a diagram illustrating an exemplary hardware configuration of the server.

An exemplary hardware configuration of the server 1 will now be described with reference to FIG. 8. FIG. 8 is a diagram illustrating an exemplary hardware configuration of the server 1. Referring to FIG. 8, the server 1 includes a central processing unit (CPU) 91, a memory 92, and the SSD 13.

The CPU 91 is connected to the memory 92 and the SSD 13 via a bus. The memory 92 stores various programs including the programs realizing the virtual machine operating unit 20, the container operating unit 30, and the I/O scheduler 10 illustrated in FIG. 2.

The CPU 91 realizes the virtual machines 11 and the host 12 illustrated in FIG. 1. The CPU 91 realizes the functions of the virtual machine operating unit 20, the container operating unit 30, and the I/O scheduler 10 illustrated in FIG. 2. Specifically, the CPU 91 reads out the various programs from the memory 92 and decomposes and executes the programs to realize the virtual machine operating unit 20, the container operating unit 30, and the I/O scheduler 10 illustrated in FIG. 2. For example, the CPU 91 and the memory 92 realize the functions of the source determiner 101, the I/O processor 102, the statistical information manager 103, and the throttling determiner 104. The CPU 91 realizes the functions of the application executers 201, the I/O receiver 202, the statistical information acquirer 203, and the throttler 204. The CPU 91 realizes the function of the application executers 301.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
        process a first processing request from a first virtual environment and a second processing request from a second virtual environment different from the first virtual environment, the first processing request and the second processing request being related to a storage device that stores data,
        collect statistical information for each of the first processing request and the second processing request at predetermined time intervals,
        determine whether to perform throttling to either of the first processing request and the second processing request based on the collected statistical information,
        acquire a ratio of the first processing request and the second processing request from the collected statistical information when determined to perform the throttling,
        determine a ratio setting for the throttling by changing the ratio using a predetermined reduction value of the ratio, and
        perform the throttling in accordance with the determined ratio setting.

2. The information processing apparatus according to claim 1, wherein
    the first virtual environment is an operating environment in which a virtual machine operates, and
    the second virtual environment is a container indicating an operating environment of an application controlled by a container management software executed on an operating system.

3. The information processing apparatus according to claim 2, wherein the processor is configured to suppress a number of processes of the first processing request output from the virtual machine and increase a number of processes of the second processing request output from the container.

4. The information processing apparatus according to claim 3, wherein the processor is configured to suppress the number of processes of the first processing request by outputting an instruction to suppress a number of outputs of the first processing request based on the predetermined reduction value of the ratio.

5. The information processing apparatus according to claim 3, wherein the processor is configured to suppress the number of processes of the second processing request by outputting an instruction to reduce the ratio at which the second processing request is processed.

6. The information processing apparatus according to claim 1, wherein the collected information is statistical information indicating a magnitude of a load of a process performed in response to each of the first processing request and the second processing request.

7. The information processing apparatus according to claim 1, wherein the statistical information includes a number of I/O requests issued for every predetermined time period.

8. The information processing apparatus according to claim 7, wherein the processor is configured to determine to perform the throttling when the number of I/O requests issued for every predetermined time period is higher than or equal to a predetermined threshold value.

9. A control method performed by a processor in an information processing apparatus, the control method comprising:
    processing a first processing request from a first virtual environment and a second processing request from a second virtual environment different from the first virtual environment, the first processing request and the second processing request being related to a storage device that stores data;
    collecting statistical information for each of the first processing request and the second processing request at predetermined time intervals;
    determining whether to perform throttling to either of the first processing request and the second processing request based on the collected statistical information;
    acquiring a ratio of the first processing request and the second processing request from the collected statistical information when determined to perform the throttling;
    determining a ratio setting for the throttling by changing the ratio using a predetermined reduction value of the ratio; and
    performing the throttling in accordance with the determined ratio setting.

10. The control method according to claim 9, wherein
    the first virtual environment is an operating environment in which a virtual machine operates, and
    the second virtual environment is a container indicating an operating environment of an application controlled by a container management software executed on an operating system.

11. The control method according to claim 10, further comprising suppressing a number of processes of the first processing request output from the virtual machine and increasing a number of processes of the second processing request output from the container.

12. The control method according to claim 11, further comprising suppressing the number of processes of the first processing request by outputting an instruction to suppress a number of outputs of the first processing request based on the predetermined reduction value of the ratio.

13. The control method according to claim 11, further comprising suppressing the number of processes of the second processing request by outputting an instruction to reduce the ratio at which the second processing request is processed.

14. The control method according to claim 9, wherein the collected information is statistical information indicating a magnitude of a load of a process performed in response to each of the first processing request and the second processing request.

15. A non-transitory computer-readable storage medium having stored therein a program for controlling an information processing apparatus, the program executing a process comprising:

processing a first processing request from a first virtual environment and a second processing request from a second virtual environment different from the first virtual environment, the first processing request and the second processing request being related to a storage device that stores data;

collecting statistical information concerning for each of the first processing request and the second processing request at predetermined time intervals;

determining whether to perform throttling to either of the first processing request and the second processing request based on the collected statistical information;

acquiring a ratio of the first processing request and the second processing request from the collected statistical information when determined to perform the throttling;

determining a ratio setting for the throttling by changing the ratio using a predetermined reduction value of the ratio; and performing the throttling in accordance with the determined ratio setting.

* * * * *